(12) United States Patent
Stirton et al.

(10) Patent No.: US 7,738,986 B2
(45) Date of Patent: Jun. 15, 2010

(54) METHOD AND APPARATUS FOR COMPENSATING METROLOGY DATA FOR SITE BIAS PRIOR TO FILTERING

(75) Inventors: James Broc Stirton, Austin, TX (US); Kevin R. Lensing, Austin, TX (US); Richard P. Good, Austin, TX (US)

(73) Assignee: GlobalFoundries, Inc., Grand Cayman (KY)

( * ) Notice: Subject to any disclaimer, the term of this patent is extended or adjusted under 35 U.S.C. 154(b) by 468 days.

(21) Appl. No.: 11/539,803

(22) Filed: Oct. 9, 2006

(65) Prior Publication Data

US 2008/0147224 A1 Jun. 19, 2008

(51) Int. Cl.
*G06F 19/00* (2006.01)
(52) U.S. Cl. ........................................ 700/109; 700/28
(58) Field of Classification Search ......... 700/109–111, 700/121, 108, 28; 382/144; 438/14
See application file for complete search history.

(56) References Cited

U.S. PATENT DOCUMENTS

| | | | | |
|---|---|---|---|---|
| 6,161,054 | A | 12/2000 | Rosenthal et al. | 700/121 |
| 6,346,426 | B1 * | 2/2002 | Toprac et al. | 438/8 |
| 6,615,101 | B1 | 9/2003 | Nicholson et al. | 700/108 |
| 6,640,151 | B1 | 10/2003 | Somekh et al. | 700/121 |
| 6,654,698 | B2 | 11/2003 | Nulman | 702/85 |
| 6,738,682 | B1 | 5/2004 | Pasadyn | 700/100 |
| 6,836,691 | B1 * | 12/2004 | Stirton | 700/108 |
| 6,898,471 | B1 | 5/2005 | Sun et al. | 700/90 |
| 7,127,304 | B1 | 10/2006 | Gould et al. | 700/121 |
| 7,127,316 | B2 | 10/2006 | Hsu et al. | 700/109 |
| 7,181,354 | B1 * | 2/2007 | Bone et al. | 702/84 |
| 7,289,864 | B2 * | 10/2007 | Horak et al. | 700/121 |
| 2006/0015206 | A1 * | 1/2006 | Funk et al. | 700/121 |
| 2006/0129257 | A1 * | 6/2006 | Chen et al. | 700/96 |
| 2006/0184264 | A1 * | 8/2006 | Willis et al. | 700/108 |
| 2007/0005172 | A1 * | 1/2007 | Malig et al. | 700/108 |
| 2007/0238201 | A1 * | 10/2007 | Funk et al. | 438/14 |

FOREIGN PATENT DOCUMENTS

DE 101 60 961 A1 6/2003
DE 601 04 705 T2 9/2005

OTHER PUBLICATIONS

Translation of Official Communication from German Patent Application Serial No. 10 2005 046 972.8-33 dated Apr. 27, 2006.
Office Action dated Sep. 17, 2008 from related U.S. Appl. No. 11/420,625.

* cited by examiner

*Primary Examiner*—Paul L Rodriguez
*Assistant Examiner*—Sheela Rao
(74) *Attorney, Agent, or Firm*—Williams, Morgan & Amerson, P.C.

(57) ABSTRACT

A method includes acquiring metrology data associated with a process. Bias information associated with the process is determined. The metrology data is adjusted based on the bias information to generate bias-adjusted metrology data. The bias-adjusted metrology data is filtered to identify and reject outlier data. The process is controlled based on the metrology data remaining after the rejection of the outlier data.

17 Claims, 2 Drawing Sheets

US 7,738,986 B2

METHOD AND APPARATUS FOR COMPENSATING METROLOGY DATA FOR SITE BIAS PRIOR TO FILTERING

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to manufacturing and, more particularly, to a method and apparatus for compensating metrology data for site bias prior to filtering.

Today's global market forces manufacturers of mass products to offer high quality products at a low price. It is thus important to improve yield and process efficiency to minimize production costs. This is especially true in the field of semiconductor fabrication where it is essential to combine cutting edge technology with mass production techniques. It is, therefore, the goal of semiconductor manufacturers to reduce the consumption of raw materials and consumables while at the same time improve product quality and process tool utilization. The latter aspect is especially important since the equipment used in modern semiconductor facilities is extremely costly and represents a dominant part of the total production costs. For example, in manufacturing modern integrated circuits, 500 or more individual processes may be necessary to complete an integrated circuit, wherein failure in a single process step may result in a loss of the complete integrated circuit. This problem is exacerbated when the size of substrates, on which a plurality of such integrated circuits are processed, steadily increases, so that failure in a single process step may entail the loss of a large number of products.

Therefore, the various manufacturing stages are thoroughly monitored to avoid undue waste of manpower, tool operation time, and raw materials. Ideally, the effect of each individual process step on each substrate would be detected by measurement and the substrate under consideration would be released for further processing only if the required specifications were met. However, such a process control strategy is not practical since measuring the effects of certain processes may require relatively long measurement times, frequently ex situ, or may even necessitate the destruction of the sample. Moreover, immense effort, in terms of time and equipment, would be required on the metrology side to provide the desired measurement results. Additionally, utilization of the process tool would be reduced since the tool would be released only after the provision of the measurement result and its assessment.

The introduction of statistical methods, also referred to as statistical process control (SPC), for adjusting process parameters significantly relaxes the above problem and allows a moderately high utilization of the process tools while attaining a relatively high product yield. Statistical process control is based on the monitoring of the process output to thereby identify an out-of-control situation, wherein a causal relationship is established to an external disturbance. After occurrence of an out-of-control situation, operator interaction is usually required to manipulate a process parameter so as to return to an in-control situation, wherein the causal relationship may be helpful in selecting an appropriate control action. Nevertheless, in total, a large number of dummy substrates or pilot substrates may be necessary to adjust process parameters of respective process tools, wherein parameter drifts during the process have to be taken into consideration when designing a process sequence, since such parameter drifts may remain undetected over a long time period or may not be efficiently compensated for by SPC techniques.

More recently, a process control strategy has been introduced, and is continuously improving, that allows a high degree of process control, desirably on a run-to-run basis, with a moderate amount of measurement data. In this control strategy, so-called advanced process control (APC), a model of a process or of a group of interrelated processes is established and implemented in an appropriately configured process controller. The process controller also receives information which may include pre-process measurement data and/or post-process measurement data, as well as information related, for instance, to the substrate history, such as type of process or processes, the product type, the process tool or process tools in which the products are to be processed or have been processed in previous steps, the process recipe to be used (i.e., a set of required steps for the process or processes under consideration, wherein possibly fixed process parameters and variable process parameters may be contained), and the like. From this information and the process model, the process controller determines a controller state or process state that describes the effect of the process or processes under consideration on the specific product, thereby permitting the establishment of an appropriate parameter setting of the variable parameters of the specified process recipe to be performed with the substrate under consideration, wherein tool-specific internal or "low-rank" control units (substantially) maintain the parameter values, such as flow rates, temperatures, exposure doses and the like, at the targets specified by the APC controller. Thus, the APC controller may have a predictive behavior, whose accuracy may depend on the amount of measurement data and its timeliness with respect to the current process run.

Generally, in process control it is desirable to make process adjustments based on known good data (i.e., data representative of the process). To that end, data is typically filtered prior to processing to identify and, subsequently, ignore outlier data. Various outlier filters, such as box filters, absolute bounds filters, etc., may be used to perform this outlier rejection. For example, a box filter typically rejects data that falls more than a predetermined distance from the mean, such as one standard deviation. An absolute bounds filter rejects data that falls outside an absolute range from a target value, such as +/−3 nm. The filtered metrology data is then supplied to the process controller for determining the process state and/or adjusting the process parameters.

The unfiltered measurement data, however, may stem from different process tools performing equivalent processes, and/or only dedicated wafers or wafer sites that are subjected to measurement. In some cases, a particular tool may process wafers slightly differently than other similar tools, such that the measurements performed on wafers processed with the tool include a consistently higher or lower value than those processed on other tools. This mismatch is commonly referred to as tool bias. Another type of bias, referred to as site bias, may also exist across different sites on a particular wafer. For example, a particular etch or polishing tool may process wafers such that sites near the periphery of a wafer have consistently higher values than those in the center (i.e., referred to as a bowl or dished profile) or consistently lower values than those in the center (i.e., referred to as a domed profile).

In some instances, the wafer or site bias is so significant that the measurement data is routinely rejected by the outlier filter. Although such biased data is outside the bounds of the outlier filter, it does not actually represent the type of outlier data the filter is attempting to reject (e.g., data associated tool or material faults). As the data reflects normal operation it would be useful for controlling the process. Errant outlier rejection reduces the total amount of useful metrology data that may be employed for process control, thereby reducing its efficacy.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method including acquiring metrology data associated with a process. Bias information associated with the process is determined. The metrology data is adjusted based on the bias information to generate bias-adjusted metrology data. The bias-adjusted metrology data is filtered to identify and reject outlier data. The process is controlled based on the metrology data remaining after the rejection of the outlier data.

Another aspect of the present invention is seen in a system including a metrology tool, a bias estimator, an outlier filter, and a control module. The metrology tool is operable to generate metrology data associated with a process. The bias estimator is operable to determine bias information associated with the process. The outlier filter is operable to adjust the metrology data based on the bias information to generate bias-adjusted metrology data and filter the bias-adjusted metrology data to identify and reject outlier data. The control module is operable to control the process based on the metrology data remaining after the rejection of the outlier data.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
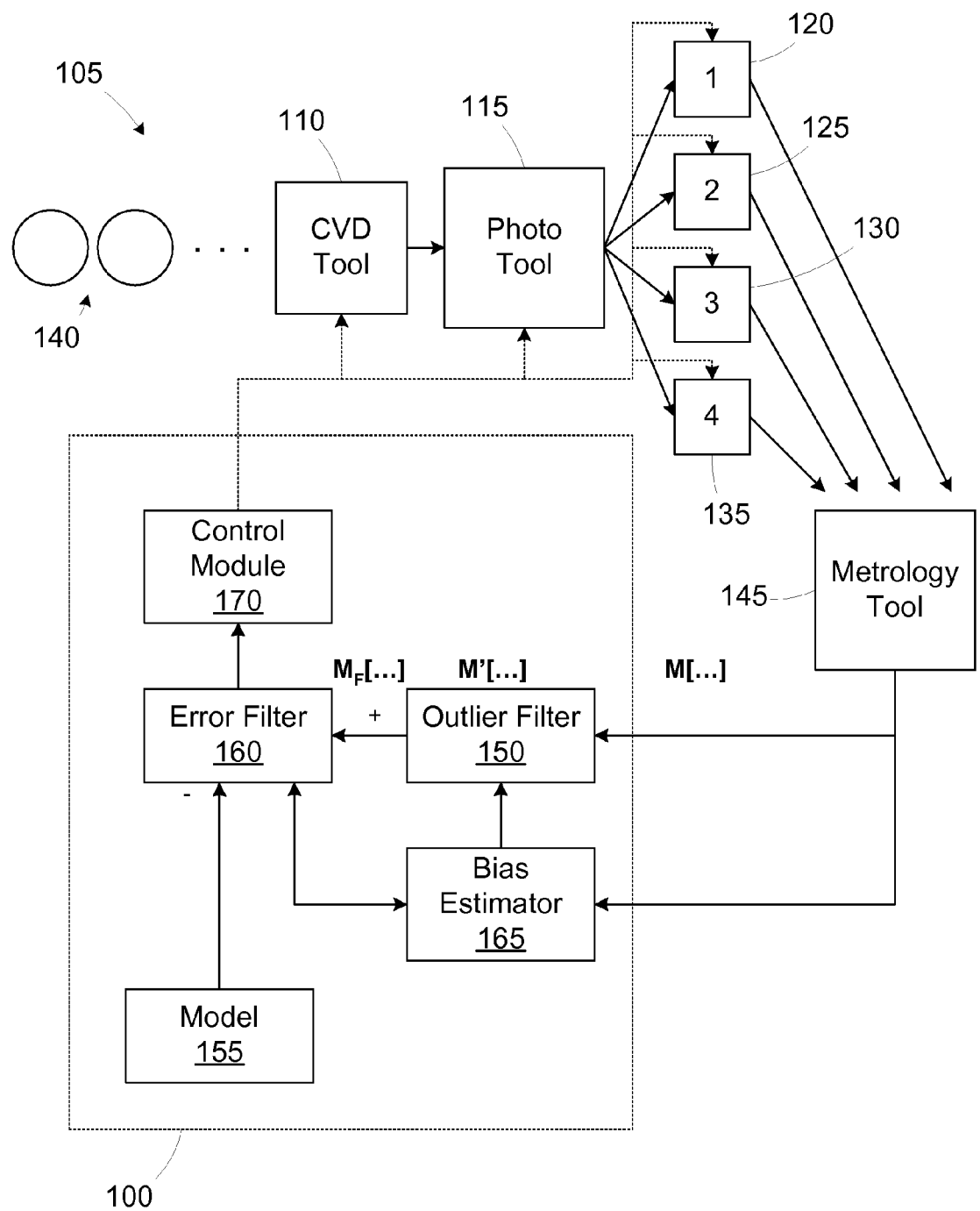
FIG. 1 is a simplified block diagram of a controller interfacing with a manufacturing environment in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present invention is directed to incorporating bias estimates into the filtering of metrology data to identify and reject outlier measurements prior to that data being employed in a process control system. In the case of process control, model-based control strategies in which the control state, i.e., one or more estimated parameters of a process model describing one or more process tools to be controlled, is determined on the basis of the filtered measurement data that represents the effect of a manufacturing process performed by the one or more process tools to be controlled.

The measurement data may be gathered on the basis of a static or dynamic sampling rate. In one illustrative embodiment, the measurement data obtained according to the sampling rate, i.e., the number of measurement results obtained from sampled substrates selected from the entirety of processed substrates, may not be available simultaneously but may have a respective delay depending on the selected sampling rate. For instance, in a lot-based process control, a sampling rate may specify a given number of substrates per lot, and also a given number of measurement sites per substrate, from which measurement results are obtained and used for process control during processing of a subsequent lot of substrates. When the number of sample substrates is less than the number of equivalent process tools used for processing the lot, the process state estimation for the subsequent lot to be processed may be based on measurement data of different age. Similarly, the measurement data obtained from the sample substrates may have a different amount of uncertainty, due to tool variations, substrate non-uniformities and the like, so that the "reliability" or "confidence" of the respective measurement data may significantly differ for the various tool or site biases.

As discussed herein, a manipulated variable or a control variable is to be understood as a process parameter of a process recipe, the value of which may be adjusted to obtain a certain effect on one or more controlled variables, which may represent an output characteristic of the process or process sequence under consideration, wherein the output characteristic may be determined on the basis of measurements. As explained above, during production conditions in a semiconductor facility, measurements may be obtained from a limited number of substrates or substrate sites only, due to throughput and cost considerations, thereby imparting an increased uncertainty to these measurement results due to a plurality of fluctuations and non-uniformities. For example, a first contribution to the measurement uncertainty may be caused by the measurement process itself, as, for instance, metrology tool induced variations, environmental influences, sample preparation, and the like may significantly affect the measurement process. On the other hand, the specific selection of the measurement samples and particularly the number thereof may also have a significant influence on the uncertainty of the measurement data, wherein, in particular, the various amounts of delay of the measurement data may also contribute to a reduced stability of the overall control process.

Referring now to the drawings wherein like reference numbers correspond to similar components throughout the several views and, specifically, referring to FIG. 1, the present invention shall be described in the context of a controller 100 associated with a manufacturing environment 105, for controlling one or more process tools contained therein. The manufacturing environment 105 may include a plurality of process tools 110, 115, 120, 125, 130, 135 which may, in one embodiment, be considered as a functional unit for performing a specified sequence of process steps on a plurality of substrates 140 so as to produce a certain process output. For example, the plurality of process tools 110, 115, 120, 125, 130, 135 may comprise deposition tools, implantation tools, etch tools, CMP tools, photolithography tools, or any combination thereof, through which the plurality of substrates 140 is processed in a specified sequence.

In the illustrative embodiment shown in FIG. 1, the manufacturing environment 105 may comprise the plurality of process tools 110, 115, 120, 125, 130, 135 as a functional block including, for instance, one or more chemical vapor deposition (CVD) tools, such as the tool 110, which may, for instance, be configured to provide a specified material layer on the plurality of substrates 140. For example, the CVD tool 110 may be configured to deposit an anti-reflective coating (ARC) layer to be formed in accordance with a specified process recipe so as to endow the specific material layer with optical characteristics required for a specified exposure process to be performed by one or more photolithography tools, which may be represented by the tool 115. It should be appreciated that any other pre-exposure tools, such as resist coating tools, pre-exposure bake tools and the like, may be provided.

For convenience, any such process tools are not shown. Furthermore, the plurality of process tools 120, 125, 130, 135 may be provided in the form of post-exposure process tools, such as post-exposure bake (PEB) plates, which may be considered as equivalent process tools. In this respect, an equivalent process tool may be considered as a process tool or a process chamber of a cluster tool which operate on the basis of substantially the same process recipe, at least for the plurality of substrates 140, in order to obtain substantially the same process output. For example, a plurality of individual process tools or a plurality of individual process chambers, which may not necessarily have the same hardware configuration, may be considered as equivalent as long as the tool setting is adjusted on the basis of the same process outcome. For instance, for an etch tool, irrespective of its hardware configuration, the process outcome may be a specified etch depth within a specified material layer, while, in a CVD tool, the process outcome may represent a specified material layer having a desired thickness, while, for instance, for PEB plates, the process outcome may be a specified temperature with a desired uniformity across each of the substrates 140. Since differences in configuration may exist, the parameter settings, i.e., the set points of tool parameters, may not be the same for obtaining the same desired process output. Nevertheless, these tools may be regarded as equivalent.

It should be appreciated that other post-exposure process tools may be provided, such as developer tools and the like, which may generate resist features that may be used for patterning, for instance, gate electrode structures and the like on the plurality of substrates 140.

The manufacturing environment 105 further comprises a metrology tool 145, which may also be comprised of a plurality of equivalent tools, depending on the measurement process to be performed. For example, the metrology tool 145 may represent an optical layer thickness measurement tool, which may determine a thickness of the exposed resist layer, as may be provided by the PEB tools 120,125, 130, 135. In other cases, the metrology tool 145 may represent an inspection instrument that is configured to estimate a critical dimension of resist features obtained after the development of the exposed resist layer. The metrology tool 145 may be configured to provide measurement data on the basis of the dynamic or static sampling rate, with which a specific number of measurements is performed on one or more of the substrates 140 having passed through the process tools 110-135. For example, a sampling rate of three substrates from the plurality or lot of substrates 140 may be selected so that, for example, the PEB tools 120, 125, and 130 may provide a substrate to be subjected to measurement in the metrology tool 145, thereby producing new measurement data representing the process outcome with respect to the equivalent PEB tools 120, 125, and 130. During the processing of a next lot of substrates 140, sample substrates may be selected from the PEB tools 125, 130, 135. As a consequence, for a subsequent state estimation on the basis of the recent results of the tools 125, 130, 135, the corresponding measurement data related to the PEB tool 120 may be considered as delayed or aged measurement data, while, in the previous case, a state estimation based on the results of the tools 120, 125, 130 may be based on delayed or aged measurement data associated with the PEB tool 135.

The controller 100 is configured to receive measurement data from the metrology tool 145 or from any other entity, such as a supervising manufacturing execution system, as is typically provided in semiconductor facilities. The controller 100 includes an outlier filter 150, a model 155, an error filter 160, a bias estimator 165, and a control module 170.

The outlier filter 150 identifies and rejects outlier measurements included in the measurement stream provided by the metrology tool 145 using bias estimates generated by the bias estimator 165.

The model 155 maintains a process state and estimates an updated process state of one or more of the process tools 110, 115, 120, 125, 130, 135 which is/are to be controlled by the controller 100. For example, the model 155 may include an algorithm for predicting a process output of the plurality of process tools 110, 115, 120, 125, 130, 135, for instance a layer thickness of an exposed resist layer, a critical dimension of a resist feature and the like, so as to provide a prediction for the actual process output, of which the measurement data supplied by the metrology tool 145 represent a more-or-less delayed or aged version from a previously performed process run. For example, the model 155 may be linearly dependent on one or more manipulated variables used for controlling the tool 115, since the exposure dose, for instance, exhibits a highly linear behavior with respect to the critical dimension under consideration.

The controller 100, through the control module 170, determines one or more updated manipulated variables, such as exposure dose, exposure time and the like when the process tool to be controlled is the photolithography tool 115. For this purpose, the control module 170 may employ a specified control law, which may be considered as an algorithm for calculating updated manipulated variables on the basis of a target value for the process output, i.e., the control variable, and a difference of the predicted process output and the measurement data obtained. The control module 170 may store a target value of the process output and also determine the difference between the predicted process output and the actual measurement values.

The error filter 160 is configured to operate on the difference between the predicted process output provided by the model 155 and the measurement data provided by the metrology tool 145 to generate an error estimate. For example, in one illustrative embodiment, the error filter 160 may have implemented therein an exponentially weighted moving average (EWMA) filter, which in principle provides an updated error estimate, i.e., a discrepancy between the predicted process output and the observed process output, on the basis of a history of the preceding error estimates, which are weighted on the basis of a scaling factor, which is usually referred to as λ. Hence, the error filter 160 provides an error estimation to be used in the controller 100.

The bias estimator 165 receives metrology data from the tool 145 and determines various bias metrics associated with the manufacturing environment 105, such as tool biases or site biases.

During run time, the substrates 140 may be processed by the process tools 110, 115 and the equivalent tools 120, 125, 130, 135 and some of the substrates 140 may be supplied to the metrology tool 145 so as to obtain a specified set of measurement results. As previously discussed, it may be assumed that the tools 120, 125 and 130 may each provide a sample substrate for this run. Their respective measurement data may then be provided to the controller 100, in which outlier measurements are rejected and a corresponding difference between the respective process outputs and the actual measurement data are determined. The presently obtained measurement data may represent the tools 120, 125 and 130, while the tool 135 may still be assessed on the basis of a previously obtained measurement data.

Due to the sampling rate limitations, it is highly advantageous to track systematic deviations, i.e., biases with respect to a specified measurement event and the specific tool configuration, for instance including the four equivalent PEB tools, 120, 125, 130, 135, as relative values, wherein a corresponding relative bias may be defined for each possible combination of equivalent tools. The following example focuses on the operation of the bias estimator 165 as it is employed to estimate tool bias. However, the techniques illustrated may also be applied to determining site bias.

In the above-illustrated example of four equivalent process tools 120, 125, 130, 135, six different relative biases may be defined, that is, 1-2, 1-3, 1-4, 2-3, 2-4 and 3-4, where "1", "2", "3", "4" correspond to the tools 120, 125, 130, 135, respectively, as indicated in FIG. 1. Hence, for the above selected sampling rate, measurement data may be obtained so as to define three relative biases corresponding to the differences 2-3, 1-2 and 1-3, while in a subsequent process run the corresponding relative biases corresponding to 2-3, 2-4, 3-4 may be determined. Consequently, only a few of all possible combinations of relative biases may be updated by measurement data obtained per measurement event. The respective bias $b_{ij}$ for any combination of tools may be determined, in which the plurality of presently valid relative biases $b_{ij}$ may be represented in the form of a matrix, as is shown in Equation 1 for an illustrative example for the four equivalent process tools 120, 125, 130, 135.

$$(b_{ij}) = \begin{pmatrix} 0 & b_{12} & b_{13} & b_{14} \\ -b_{12} & 0 & b_{23} & b_{24} \\ -b_{13} & -b_{23} & 0 & b_{34} \\ -b_{14} & -b_{24} & -b_{34} & 0 \end{pmatrix} \quad (1)$$

where $b_{12}$ is the difference in bias between the tools 120, i.e., tool 1, and 125, i.e., the tool 2.

Hereby, the relative biases, i.e., the components of the bias matrix $B_{LP}$ are calculated, for instance, on the basis of Equation 2:

$$[b_{ij}]_N = \lambda_N [b_{ij}]_N + (1-\lambda_N)[\tilde{b}_{ij}]_N \quad (2)$$

where $b_{ij}$ represents actual measurement values and wherein Equation 2 may provide for the possibility of using a different filter parameter $\lambda_N$ for one or more of the metrology events N. As may be seen from Equation 2, the currently used bias $b_{ij}$ includes the controller history as well as the measurement data provided so far, wherein the value of $\lambda_N$ that is to be selected in the range of [0,1] significantly determines the controller behavior as the value of $\lambda_N$ determines the "strength" with which the process history influences the currently generated process state.

Consequently, depending on the number of equivalent process tools and the sampling rate, the components of the bias matrix have a varying age so that a determination of any mean bias based on the various relative biases of varying age and also of varying uncertainty will result in a less precise difference and thus in a less precise prediction of one or more manipulated variables used for controlling, for instance, the process tool 115. In principle, for a given bias, the corresponding value may be directly obtained from the bias matrix or the corresponding value may be calculated from a linear combination of other available relative biases. By way of example, the relative bias $b_{14}$ may be considered for the further explanation. In this case, the component $b_{14}$ may be obtained from the bias matrix (see Equation 1), or a linear combination of $b_{24}$-$b_{21}$, or $b_{34}$-$b_{31}$ may be used for determining the value of $b_{14}$. Ideally, these values would be exactly the same. However, due to the time delay in updating the various relative biases and using real data, i.e., including noise and thus having an uncertainty, the values are typically different. Moreover, the corresponding process tools 120, 125, 130, 135 may drift over time and, therefore, a significant deviation of the various relative biases, which should ideally result in the same value, may be observed. Consequently, in one illustrative embodiment, a weighted mean value of some, or in one particular embodiment of all, linear combinations which yield a $b_{14}$-equivalent bias, i.e., in this specific case: $b_{14}$, $(b_{24}-b_{21})$ and $(b_{34}-b_{31})$ may be used. In one illustrative embodiment, a weighting factor may be used on the basis of an age of the corresponding relative bias values. In one particular embodiment, a weighting factor is established on the basis of an age-based uncertainty of the respective relative biases.

In still other illustrative embodiments, the weighting factor may be based on a measure of the uncertainty of measurement data associated with the corresponding relative biases involved in determining the $b_{14}$-equivalent bias. For example, a measure for an uncertainty of a measurement data may be calculated on the basis of a standard error "s" according to Equation 3:

$$s = \frac{\sigma}{\sqrt{k}} \quad (3)$$

wherein the standard error "s" is determined by the standard deviation σ and the number of measurements k. It should be appreciated, however, that other statistical formulas and techniques may be used in calculating an uncertainty of measurement data. As previously explained with reference to Equation 2, since each bias value in the bias matrix is an EWMA of all observations of that particular bias, a corresponding uncertainty may be calculated by using the way in which the EWMA is calculated. Thus, an uncertainty of the corresponding relative biases, i.e., the EWMA estimates, may be obtained according to the following Equation 4, wherein for convenience the uncertainty "u" for the relative bias $b_{14}$ is illustrated:

$$u(b_{14}) = \quad (4)$$
$$\sqrt{u^2[(b_{14})_N]\left[\prod_{i=0}^{N-1}(1-\lambda_i)\right]^2 + \ldots + u^2[(b_{14})_1][(1-\lambda_0)]^2 + u^2[(b_{14})_0]\lambda_0^2}$$

Here, different filter factors $\lambda_i$ may be used for one or more metrology events N. As may be seen from Equations 4 and 3, an increased value for the uncertainty "u" may be obtained when the corresponding standard error for the respective metrology event N is increased, wherein the respective filter factor λ is also taken into consideration. Consequently, for measurement data of increased noise or any other influences, which may lead to an increased uncertainty, this situation may be explicitly taken into consideration by weighting the respective relative biases prior to estimating an updated process state by means of the controller 100.

In a further illustrative embodiment, alternatively or additionally to determining an uncertainty for each of the relative biases of the bias matrix, an age-based weighting factor may be established such that older measurement data may have a reduced influence on the calculation of a mean bias that may be used for the further calculation in determining manipulated variables to be used in the current control move. In one particular embodiment, an age-based component is combined with the uncertainty, for instance as determined above, such that older measurement data results in an increased uncertainty. This is particularly useful if a drift is observed in one or more of the equivalent process tools 120, 125, 130, 135. In one illustrative embodiment, an age-based weighting factor may be used to scale the uncertainty of the respective relative bias, wherein the corresponding age-based weighting factor may represent any appropriate function that increases the uncertainty with an increased age of the respective metrology event. For example, Equation 5 enables the determination of an age-based uncertainty u' on the basis of a scaling factor and the age of measurement data received from the metrology tool 145:

$$u'[(b_{14})_N] = u[(b_{14})_N]\exp(-Kt_N) \quad (5)$$

where u' $[(b_{14})_N]$ is the age-based uncertainty of the Nth observation of the relative bias $b_{14}$, $[(b_{14})_N]$ is the uncertainty of the Nth observation of the relative bias $b_{14}$, K is a scaling factor, for instance a constant factor that may be selected for a proper amount of increase in uncertainty with age, for example, a value of K=0.1 may result in a weighting of about 90% for 24-day-old data and 5% for 30-day-old data, and $t_N$ is the age of the measurement data corresponding to the Nth observation in hours.

In one illustrative embodiment, the weighting of the individual components of the bias matrix may be performed with the uncertainty and/or the age-based weighting factor, wherein, in one embodiment, a weighted mean value for each of the matrix components $b_{ij}$ may be calculated on the basis of some or all $b_{ij}$ equivalent relative biases and an age-based uncertainty, such as the uncertainty determined by Equation 5. In the case of the relative bias $b_{14}$, a corresponding weighted mean value $\hat{b}_{14}$ may be obtained according to Equation 6:

$$\hat{b}_{14} = \frac{\frac{1}{u'(b_{14})}b_{14} + \frac{1}{u'(b_{24}-b_{21})}(b_{24}-b_{21}) + \frac{1}{u'(b_{34}-b_{31})}u'(b_{34}-b_{31})}{\frac{1}{u'(b_{14})} + \frac{1}{u'(b_{24}-b_{21})} + \frac{1}{u'(b_{34}-b_{31})}} \quad (6)$$

where $$u'(b_{24}-b_{21}) = \sqrt{u'(b_{24}) + u'(b_{21})} \quad (7)$$
$$u'(b_{34}-b_{31}) = \sqrt{u'(b_{34}) + u'(b_{31})}$$

Consequently, using the weighted mean value $b_{ij}$ as estimates for the respective components of the bias matrix may significantly enhance the control efficiency, since data with small uncertainty, i.e., the number of sample substrates is higher while the historical variance is lower, and/or with the lowest age, i.e., the most recent measurement data, is weighed more heavily. Thus, a weighted matrix may be defined by determining the respective weighted mean values for each of the components of the original bias matrix. Equation 8 illustrates the weighted bias matrix, now including the weighted mean values for each of the relative biases $b_{ij}$:

$$(\hat{b}_{ij}) = \begin{pmatrix} 0 & \hat{b}_{12} & \hat{b}_{13} & \hat{b}_{14} \\ & 0 & \hat{b}_{23} & \hat{b}_{24} \\ & & 0 & \hat{b}_{34} \\ & & & 0 \end{pmatrix} \quad (8)$$

On the basis of the weighted bias matrix of Equation 8, a representative mean bias for each of the equivalent process tools 120, 125, 130, 135 may be calculated by using the respective averaged relative biases associated with a respective one of the tools 120, 125, 130, 135. That is, a mean bias for the tool 120 may be calculated by using the components of the weighted bias matrix of the first row, using, for instance, a simple averaging algorithm such as illustrated in Equation 9:

$$\overline{b}_1 = \frac{0 + \hat{b}_{12} + \hat{b}_{13} + \hat{b}_{14}}{4} \quad (9)$$

A corresponding mean bias may thus be established for each of the equivalent tools 120, 125, 130, 135.

In a next step, so-called delta-to-mean values may then be determined for each of the equivalent process tools by using the respective mean values established for each of the process tools 120, 125, 130, 135. For instance, the corresponding delta-to-mean values may be calculated by subtracting the respective mean bias from the corresponding respective relative mean bias. For instance, a corresponding matrix of delta-to-mean values ($\tilde{b}_{ij}$) may be obtained according to Equation 10:

$$(\tilde{b}_{ij}) = \begin{pmatrix} 0 - \overline{b}_1 & \hat{b}_{12} - \overline{b}_1 & \hat{b}_{13} - \overline{b}_1 & \hat{b}_{14} - \overline{b}_1 \\ -\hat{b}_{12} - \overline{b}_2 & 0 - \overline{b}_2 & \hat{b}_{23} - \overline{b}_2 & -\hat{b}_{24} - \overline{b}_2 \\ & & 0 - \overline{b}_3 & -\hat{b}_{34} - \overline{b}_3 \\ & & & 0 - \overline{b}_4 \end{pmatrix} \quad (10)$$

Then, based on the matrix according to Equation 10, a corresponding "consensus" delta-to-mean value may be determined for each of the equivalent process tools 120, 125, 130, 135 by determining a weighted mean value of each row of the matrix according to Equation 10. A corresponding weighting factor may be obtained, as in the case described above, by the reciprocal of the respective uncertainty (see Equation 6). Based on the corresponding consensus delta-to-mean values, individual substrate offsets may be calculated with respect to the equivalent process tools 120-135.

The individual substrate offsets may be employed by the controller 100 to provide manipulated variables to one or more of the process tools 115, 110, 120, 125, 130, 135 for efficient process control.

These individual offsets may also be employed by the outlier filter 150 for use in rejecting certain measurements provided by the metrology tool 145. Again, although the preceding example focused on tool bias estimates, a similar approach may be taken to estimate site biases. In such an embodiment, the relative biases may be tracked between wafer sites. For example, a metrology plan may involve the sampling of nine fixed sited on a wafer. The bias matrix may have nine rows and columns, each representing one of the sites. The processing described above may be completed for each of the sites to generate individual site offsets. In the case of multiple process tools performing the same process, a different site bias matrix may be maintained for each process tool.

Depending on the particular embodiment, the outlier filter 150 may employ individual site or tool bias offsets for adjusting the metrology data prior to filtering. The outlier filter 150 receives a metrology data vector, M, including measurements from different lots, wafers, and/or sites. Prior to performing the outlier rejection, the outlier filter 150 adjusts the metrology data based on the associated tool or site biases to generate an adjusted metrology data vector, M'. The outlier filter 150 may adjust a particular measurement once for the associated tool and a second time for the associated site. The outlier filter 150 then filters the data using the appropriate outlier rejection algorithm (e.g., box filter or absolute bounds) to identify and reject outlier data. The filtered measurement vector, $M_F$, is provided to the error filter for subsequent APC control. The filtered measurement vector, $M_F$, is based on the original measurement vector, M, less the measurements that were rejected by the outlier filter 150. These measurements may be subsequently adjusted again for site or tool bias as described above prior to being incorporated into the adjusted state.

In this manner, the amount of measurement data considered by the controller 100 is increased, as the data is compensated for bias prior to filtering. Hence, the amount of "good" data rejected by the outlier filter 150 is decreased. Moreover, an estimated wafer mean calculated using the filtered measurement vector, $M_F$, more accurately reflects the actual mean.

Consider a nine-site measurement vector. Two sites may historically measure low, for instance, these sites may be edge sites in an edge-fast CMP process, where the metrology tool 145 measures thickness. If these sites had not been compensated for bias prior to filtering they may have been removed by the outlier filter 150. A resulting wafer mean estimate (i.e., using the seven remaining sites) would be biased high. Incorporating the biased measurements allows the estimated mean to reflect the contribution of the sites with increased bias. Effectively, the estimated mean may be calculated based on what the values for the bias-adjusted sites should have been given their historical biases and the values of the other sites. This adjusted mean estimate more accurately reflects the condition of the wafer and is more useful for comparing against other wafer mean estimates.

Figure 2:
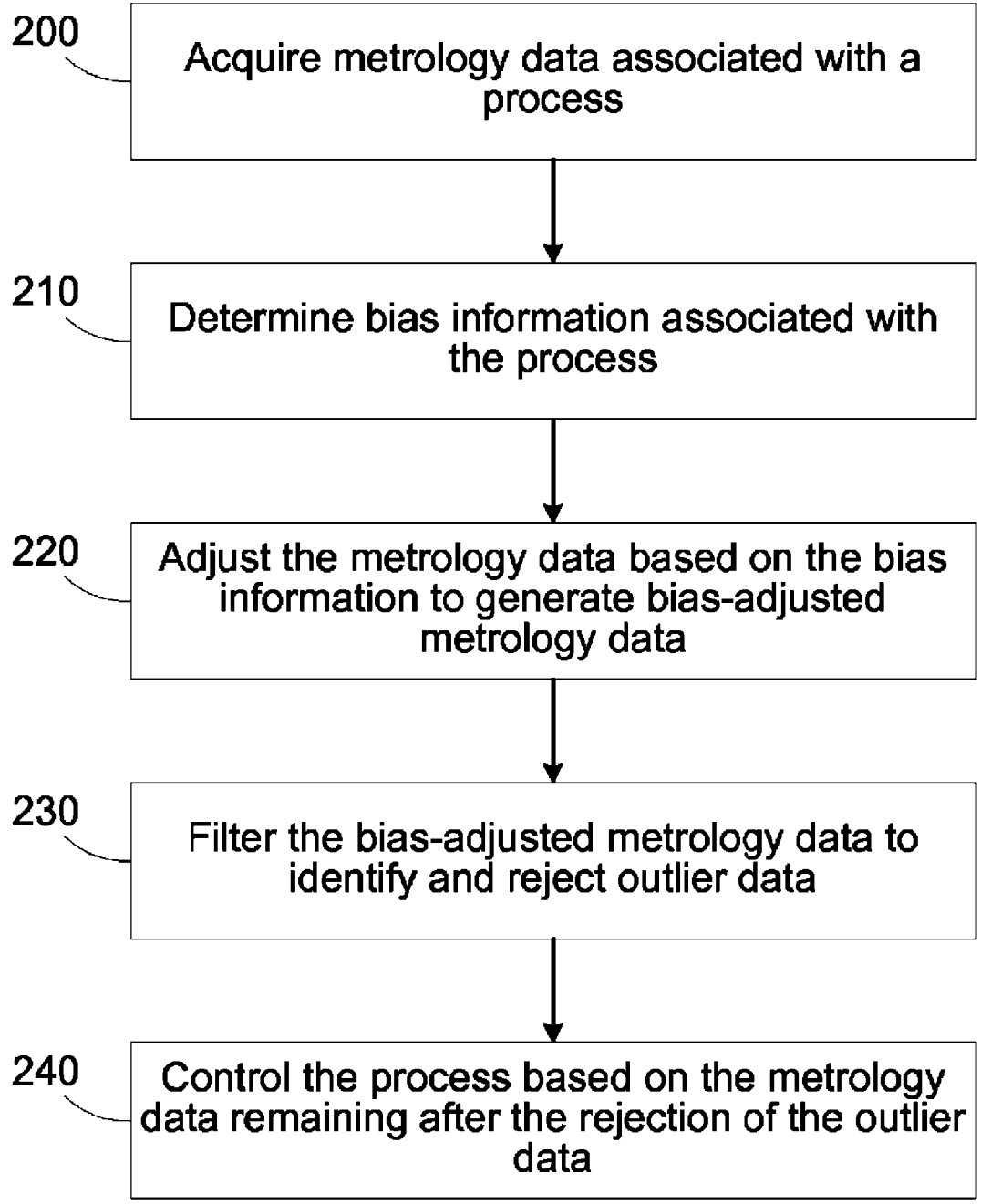
FIG. 2 is a simplified flow diagram of a method for filtering data in accordance with another illustrative embodiment of the present invention.

Referring now to FIG. 2, a simplified flow diagram of a method for filtering metrology data in accordance with another illustrative embodiment of the present invention is provided. In method block 200, metrology data associated with a process is acquired. Bias information associated with the process is determined in method block 210. In method block 220, the metrology data is adjusted based on the bias information to generate bias-adjusted metrology data. The bias-adjusted metrology data is filtered to identify and reject outlier data in method block 230. In method block 240, the process is controlled based on the metrology data remaining after the rejection of the outlier data.

Incorporating bias estimates into the measurement data prior to outlier filtering provides numerous advantages. Adjusting the measurements according to the expected historical bias results in metrology data associated with tools or sites having bias not being routinely rejected as outlier data by the filter. Hence, the bias adjustment increases the data available to the process controller for estimating the process state and controlling the process tools. The bias of a plurality of process tools or sites may be effectively monitored on the basis of a bias matrix including the relative biases, from which individual bias offsets may be derived. Thus, the overall efficiency of an APC controller may be enhanced, leading to increased performance, and ultimately increased profitability for the manufactured items.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method, comprising:
   acquiring metrology data associated with a process;
   determining a plurality of relative bias measures associated a plurality of process tools employed to perform the process, each relative bias measure indicating bias between two of the plurality of process tools;
   determining bias offsets for each of the process tools based on the relative bias measures;
   adjusting the metrology data based on the bias offsets to generate bias-adjusted metrology data;
   filtering the bias-adjusted metrology data to identify and reject outlier data; and
   controlling the process based on the metrology data remaining after the rejection of the outlier data.

2. The method of claim 1, wherein controlling the process further comprises controlling the process based on the bias-adjusted metrology data remaining after the rejection of the outlier data.

3. The method of claim 1, wherein filtering the bias-adjusted metrology data further comprises:
   identifying data points rejected in the bias-adjusted metrology data; and
   removing corresponding data points from the metrology data.

4. The method of claim 1, wherein adjusting the metrology data further comprises adjusting the metrology data associated with a selected process tool based on the individual tool bias offset associated with the selected process tool.

5. The method of claim 1, wherein the metrology data is associated with a plurality of metrology sites, and the method further comprises determining bias information associated with each of the metrology sites.

6. The method of claim 5, wherein determining the bias information further comprises:
   determining relative site bias measures associated with the metrology sites; and
   determining individual site offsets for each of the metrology sites based on the relative site bias measures.

7. The method of claim 6, wherein adjusting the metrology data further comprises adjusting the metrology data associated with a selected metrology site based on the individual site offset associated with the selected metrology site.

8. The method of claim 1, wherein the process comprises a semiconductor fabrication process operable to process a plurality of wafers, and the method further comprises processing wafers subsequent to controlling the process.

9. A system, comprising:
   a metrology tool operable to generate metrology data associated with a process;
   a bias estimator operable to determine a plurality of relative bias measures associated a plurality of process tools employed to perform the process, each relative bias measure indicating bias between two of the plurality of process tools and determine bias offsets for each of the process tools based on the relative bias measures;
   an outlier filter operable to adjust the metrology data based on the bias offsets to generate bias-adjusted metrology data and filter the bias-adjusted metrology data to identify and reject outlier data; and
   a control module operable to control the process based on the metrology data remaining after the rejection of the outlier data.

10. The system of claim 9, wherein the control module is operable to control the process based on the bias-adjusted metrology data remaining after the rejection of the outlier data.

11. The system of claim 9, wherein the outlier filter is operable to identify data points rejected in the bias-adjusted metrology data and remove corresponding data points from the metrology data.

12. The system of claim 9, wherein the outlier filter is operable to adjust the metrology data associated with a selected process tool based on the tool bias offset associated with the selected process tool.

13. The system of claim 9, wherein the metrology data is associated with a plurality of metrology sites, and the bias estimator is further operable to determine bias information associated with each of the metrology sites.

14. The system of claim 13, wherein the bias estimator is operable to determine relative biases associated with the metrology sites and determine site offsets for each of the metrology sites based on the relative biases.

15. The system of claim 14, wherein the outlier filter is operable to adjust the metrology data associated with a selected metrology site based on the site offset associated with the selected metrology site.

16. The system of claim 9, wherein the process is a semiconductor fabrication process, and the process tools are operable to process a plurality of wafers subsequent to the control module controlling the semiconductor fabrication process.

17. A system, comprising:
   means for acquiring metrology data associated with a process;
   means for determining a plurality of relative bias measures associated a plurality of process tools employed to perform the process, each relative bias measure indicating bias between two of the plurality of process tools;
   means for determining bias offsets for each of the process tools based on the relative bias measures;
   means for adjusting the metrology data based on the bias offsets to generate bias-adjusted metrology data;
   means for filtering the bias-adjusted metrology data to identify and reject outlier data; and
   means for controlling the process based on the metrology data remaining after the rejection of the outlier data.

* * * * *